United States Patent
Enriquez et al.

(10) Patent No.: US 8,732,912 B2
(45) Date of Patent: May 27, 2014

(54) STRAP WITH IMPROVED COLUMN STIFFNESS

(75) Inventors: Manuel C. Enriquez, Morton Grove, IL (US); Ronald L. Smith, Pleasant Prairie, WI (US); Paulette Van Erden, legal representative, Wildwood, IL (US); Michael J. McMahon, Palatine, IL (US); Robert G. Kobetsky, Chicago, IL (US); Don Van Erden, Wildwood, IL (US)

(73) Assignee: Illinois Tool Works Inc., Glenview, IL (US)

( * ) Notice: Subject to any disclaimer, the term of this patent is extended or adjusted under 35 U.S.C. 154(b) by 202 days.

(21) Appl. No.: 13/047,482

(22) Filed: Mar. 14, 2011

(65) Prior Publication Data

US 2011/0271493 A1    Nov. 10, 2011

Related U.S. Application Data

(60) Provisional application No. 61/331,707, filed on May 5, 2010.

(51) Int. Cl.
*B65D 63/00* (2006.01)

(52) U.S. Cl.
USPC ........ 24/16 PB; 24/17 AP; 24/20 R; 24/16 R; 24/1; 24/30.5 P

(58) Field of Classification Search
None
See application file for complete search history.

(56) References Cited

U.S. PATENT DOCUMENTS

| | | | |
|---|---|---|---|
| 3,066,366 A | 12/1962 | Wycoff et al. | |
| 3,104,937 A | 9/1963 | Wyckoff et al. | |
| 3,320,225 A * | 5/1967 | Roy | 428/156 |
| 3,447,207 A * | 6/1969 | Danzer | 24/16 R |
| 3,514,815 A | 6/1970 | Evans | |
| 3,746,608 A | 7/1973 | Takahashi | |
| 4,152,475 A | 5/1979 | Haley | |
| 4,388,991 A | 6/1983 | Price | |
| 4,872,242 A | 10/1989 | Allan | |

(Continued)

FOREIGN PATENT DOCUMENTS

GB    891829 A    3/1962

OTHER PUBLICATIONS

International Search Report and the Written Opinion of the International Searching Authority issued on Jul. 8, 2011, in connection with PCT/US2011/033589.

(Continued)

*Primary Examiner* — Jack W. Lavinder
(74) *Attorney, Agent, or Firm* — Levenfeld Pearlstein, LLC

(57) ABSTRACT

A strap having increased column stiffness includes a leading edge and a trailing edge forming a length of the strap, a first outer edge and second outer edge defining a width of the strap, and a first side and a second side defining a thickness of the strap. A crush region is formed in the first or second side, between and generally parallel to the first and second outer edges. The crush region is defined by a thickness that is less than the thickness of the strap adjacent to the crush region. The crush region forms a line along which a bend may be formed in the strap. The bend increases the column stiffness of the strap at least about 67 percent over that of a comparable flat strap. The bend defines an acute angle and an obtuse angle in the strap as viewed in cross-section.

11 Claims, 3 Drawing Sheets

(56) References Cited

U.S. PATENT DOCUMENTS

| | | |
|---|---|---|
| 5,121,524 A | 6/1992 | Mortensen |
| 5,232,777 A | 8/1993 | Sipinen et al. |
| 5,912,026 A | 6/1999 | Gokeen et al. |
| 6,210,769 B1 | 4/2001 | DiPede et al. |
| 6,438,807 B1 | 8/2002 | Ptolemy |
| 6,938,305 B2 | 9/2005 | Garver |
| 2005/0082147 A1 | 4/2005 | Mol |
| 2005/0278901 A1 | 12/2005 | Huang |
| 2008/0201911 A1 | 8/2008 | Pearson |

OTHER PUBLICATIONS

International Search Report and the Written Opinion of the International Searching Authority issued on Jul. 28, 2008, in connection with PCT/US2008/053718.

Search report for TW Application No. 100115372 dated Nov. 22, 2013.

* cited by examiner

STRAP WITH IMPROVED COLUMN STIFFNESS

CROSS REFERENCE TO RELATED APPLICATIONS

This application claims the benefit of U.S. Provisional Application No. 61/331,707, filed May 5, 2010.

FIELD OF THE DISCLOSURE

The present disclosure relates to strapping material. More particularly, the present disclosure relates to a strap, such as a plastic strap, formed with a compressed or crush region, about which the strap can be folded or bent to increase a column stiffness of the strap. Such a strap is particularly useful for automated strapping machines (or "strappers").

BACKGROUND

Strapping machines or strappers are in widespread use for securing bands of plastic strap around loads. One type of known strapper includes a strapping head and drive mechanism mounted within a frame. A chute is mounted to the frame through which strapping material is fed. The chute includes an assembly for guiding and retaining the strap in the chute so that the strap cannot fall or be pulled inwardly against the load until after a loop of strap has been formed around the load.

The chute is typically constructed in a shape and size suitable to surround and accommodate various shapes and sizes of loads to be strapped. For example, the chute may be generally constructed in a rectangular or square shape since typical loads to be strapped share such a general shape. In one example, the strap guiding and retaining assembly functions to initially maintain the strap in the largest possible loop configuration and to permit the strap to be fed around the load without impinging upon or snagging within the chute.

Prior art chute designs generally employ modular chute components, which are assembled to form the desired chute size and shape. For square and rectangular chutes, the chutes generally include horizontal and vertical chute sections, which are often supported by support beams and connected by corner assemblies. The chute typically is enclosed by a strap retaining and release mechanism of a type well known in the art. It will be appreciated that as loads become larger, so too does the size of the chute to accommodate such larger loads.

In one known strapper, the chute is mounted proximate a work surface and the strapping head is mounted below the work surface to a horizontal portion of the chute. The drive mechanism is also mounted below the work surface proximate the strapping head. In the present example, the drive mechanism urges or feeds the strap through the strapping head and into and around the chute until the strap material returns to the strapping head to form a loop around the load. Essentially, the strap is pushed through the chute by the drive mechanism. After the strap loop has been formed, tension is applied to the strap to constrict the strap loop about the load, and overlapping strap ends are secured by conventional means to create a sealed, tensioned loop around the load.

Generally, there has been a trend to decrease the thickness of the strap. This trend may be due, in part, to the finding that thinner straps (lesser strap gauges) can be used to effectively strap or bundle loads at a lower strap material cost. However, as strap gauge is reduced, the stiffness of the strap is also reduced. This results in strap that may be difficult to push or feed through the strap chute and a greater potential for strap misfeeds, such as short feeds and the like.

To help prevent such misfeeds, it is generally desirable that the strap material exhibit a degree of longitudinal or column stiffness, such that a leading edge of the strap remains generally parallel to the direction of travel (e.g., the strap does not bow or sag downward or inward to an unacceptable degree when traversing along portions of the chute). A degree of column stiffness is also desired such that the strap resists curling, twisting, snagging, or bunching as the strap travels through the chute. However, known straps exhibit only moderate levels of column stiffness due to inherent physical properties of the materials used to form such straps, and the desire to manufacture such straps with minimal thickness and weight.

One example of a strap having improved column stiffness is formed by creating one or more longitudinal ribs in the strap. Such a strap is disclosed in Pearson et al. U.S. Publication No. 2008/0201911, which is incorporated herein by reference. While the ribbed strap of Pearson has been shown to exhibit increased column stiffness, in such ribbed strap, the rib formation is made upon fabrication of the strap, which can increase strap fabrication costs and may increase the size of a spool around which the strap is coiled for an equivalent length of flat strap.

Accordingly, there is a need for a strap with enhanced column stiffness that resists snagging or bunching during travel around the chute of a strapper. Desirably, such a strap would not increase the amount of material required for an equivalent length strap. Also desirably, such a strap is provided in a flat form so as to not increase the spool size for an equivalent length of flat strap or to decrease the total length of strap supplied on typical spool sizes.

BRIEF SUMMARY

Various embodiments of the present disclosure provide a plastic strap with increased column stiffness. The strap has a leading edge and a trailing edge forming a length of the strap, a first outer edge and second outer edge defining a width of the strap, and a first side and a second side defining a thickness of the strap. A crush region is formed in the first or second side, between and generally parallel to the first and second outer edges. The crush region is defined by a thickness that is less than the thickness of the strap adjacent to the crush region. Further, the crush region forms a line along which a bend may be formed in the strap. The bend increases the column stiffness of the strap at least about 67 percent and up to about 1000 percent of a comparable flat strap. The bend defines a first angle greater than 180 degrees and a second angle less than 180 degrees in the strap as viewed in cross-section. The bend may also define first and second non-coplanar, longitudinally extending sections.

Still other embodiments of the present disclosure provide a method of forming a strap having increased column stiffness that includes the step of forming a strap having a leading edge and a trailing edge forming a length of the strap, a first outer edge and second outer edge defining a width of the strap, and a first side and a second side defining a thickness of the strap. The method further includes the step of crushing a region in the first or second side, between and generally parallel to the first and second outer edges, the crush region defined by a thickness that is less than the thickness of the strap adjacent to the crush region, the crush region forming a line along which a bend is formable in the strap to increase a column stiffness of the strap at least about 67 percent over that of a comparable flat strap, wherein the bend, when formed, defines an acute angle and an obtuse angle in the strap as viewed in cross-section.

In this manner, the present disclosure provides a strap with improved column strength and without increased material cost. The strap also can be provided in a flat form to not increase the spool sizes for an equivalent length of flat strap or to not decrease the total length of strap supplied on typical spool sizes. Further, the strap tends to exhibit less coil memory or curl as the strap is dispensed from a spool and enters a strapping machine, as compared to known straps.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
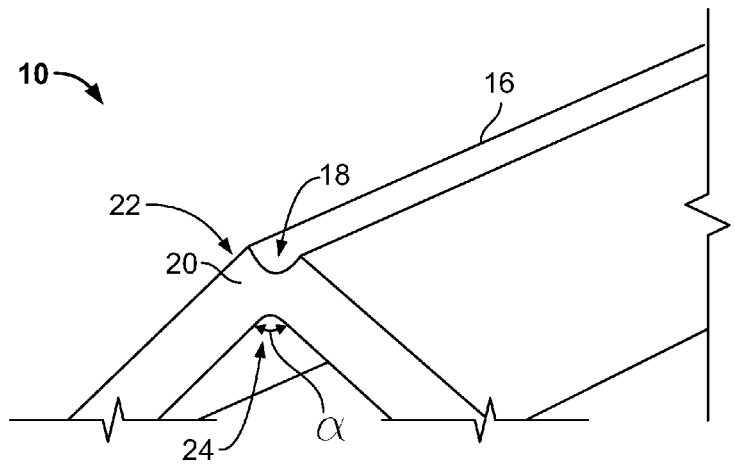
FIG. 1 is an isometric illustration of a section of strap with increased column stiffness in accordance with an embodiment of the present disclosure, the strap shown with a crush region on an obtuse angle of the strap.
Figure 2:
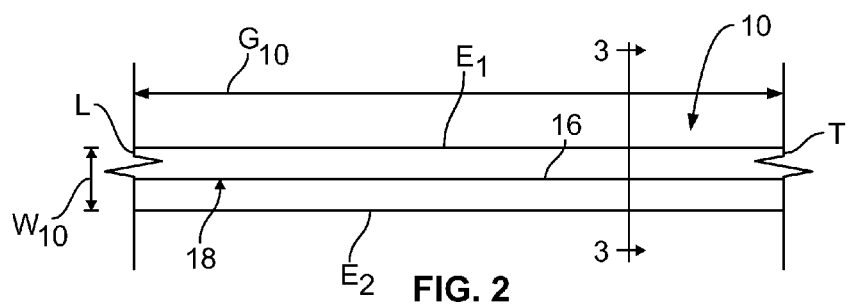
FIG. 2 is a plan view of the strap of FIG. 1.
Figure 3:
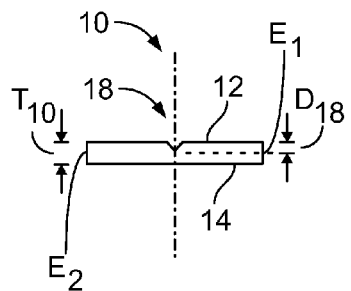
FIG. 3 is cross-sectional view of the strap of FIG. 1 in a flat form, taken generally along lines 3-3 of FIG. 2.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated. The words "a" or "an" are to be taken to include both the singular and the plural. Conversely, any reference to plural items shall, where appropriate, include the singular.

Referring now to the figures and in particular to FIG. 1, there is shown a strap 10 with improved column stiffness in accordance with an embodiment of the present disclosure. The strap 10 is a generally thin, rectangular strip of flexible plastic material configured to be disposed about a load, tensioned, and sealed. The composition of the strap 10 can be, for example, a polyester strap that may be fabricated from recycled materials, such as ITW Signode TENAX® brand 1612 strap commercially available from ITW Signode of Glenview, Ill. The TENAX® 1612 strap is a polyethylene terephthalate ("PET") strap having a width of about ⅜ inch (about 9 mm) and an average strength of about 250 lbs (about 1100 N). Such a strap is strong and flexible, but also lightweight to increase minimally the overall weight of a strapped load. In other embodiments, the strap may be formed from other materials, such as nylon or polypropylene, and may have a different width and/or average strength, as would be apparent to one of ordinary skill in the art.

The strap 10 may be formed in a flat sheet form, slit or cut to a desired width, and rolled onto coils for dispensing as needed, in any known manner. The strap 10 has a leading edge L and a trailing edge T forming a length $G_{10}$ of strap 10. It should be understood that the length $G_{10}$ of strap 10 may vary depending upon the size of the load to the strapped. The strap 10 defines a first outer edge $E_1$ and a second outer edge $E_2$ forming a width $W_{10}$ of the strap 10. It should be understood that although a width (e.g., about ⅜ inch) is provided for reference, the width $W_{10}$ of the strap may vary depending upon the specific load to be strapped and the desired strength of the strap, and further that such variations in width are within the scope and spirit of the present disclosure.

The strap 10 also has an upper surface 12 and a lower surface 14 that define a thickness $T_{10}$ of the strap 10. Again, although a thickness (e.g., about 12 mils) is provided for reference, it will be understood that the thickness $T_{10}$ of the strap 10 may vary depending upon the specific load that is to be strapped and the desired strength of the strap, and further that such variations in thickness are within the scope and spirit of the present disclosure.

The strap 10 is formed with a central, longitudinal crease 16, which is also viewed as a crush or compressed region, indicated generally at 18. The crush region 18 provides a longitudinal line along which the strap 10 can be folded or bent, as indicated generally at 20 in FIG. 1, to increase the column or longitudinal stiffness of the strap. In accordance with one example, the crush region 18 is made to a depth $D_{18}$ of about 1 mil to about 5 mils. In accordance with another example, the crush region 18 is made to a depth $D_{18}$ of about 2 mils to about 3.5 mils. It has been found that forming the crush region 18 tends to widen the strap 10 by about 3 to 4 mils, but that such increase in the width $W_{10}$ does not adversely affect use of the strap 10 in known strapping machines.

It is contemplated that the crush region 18 can be formed as the strap 10 is formed or fabricated. It is further contemplated that the bend or fold 20 in the strap 10 can be formed prior to use, for example, before the strap is fed through a chute of a strapping machine. Such formation of the bend 20 may be accomplished by a device or assembly adjacent to or part of a strap dispenser of the strapping machine, as would be apparent to one of ordinary skill in the art. It is also contemplated that the bend 20 can be formed during formation or fabrication of the strap 10 in any manner recognized by those skilled in the art.

Figure 4:
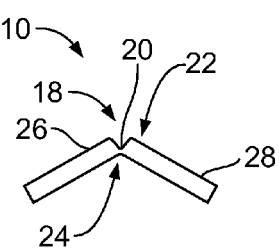
FIG. 4 is a sectional view of the strap of FIG. 1, similar to FIG. 3, with the strap bent in a first direction and having the crush region at the obtuse angle, similar to FIG. 1.
Figure 5:
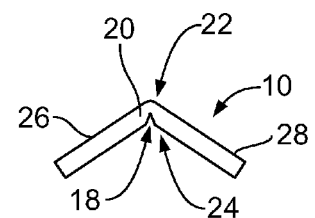
FIG. 5 is a sectional view of the strap of FIG. 1, similar to FIG. 3, with the strap bent in a second direction and having the crush region at an acute angle thereof.

In the illustrated strap 10 of FIGS. 1 and 4, the strap is bent in a first direction so that the crush region 18 is disposed on an exterior portion 22 or a first angle of the strap. The first angle is measured between adjacent surfaces of the exterior portion 22. The first angle is greater than 180 degrees. In FIG.5, the strap is bent in a second direction so that a crush region 18 is disposed on an interior portion 24 or a second angle of the strap. The second angle is measured between adjacent surfaces of the interior portion 24. The second angle is less than 180 degrees. The configurations of FIGS. 1, 4, and 5 each function well to affect the increased column stiffness in the strap 10.

In accordance with one example, the bend 20 may be formed at an angle α, i.e., the second angle, that is less than 180 degrees (flat strap) and up to about 110 degrees. In accordance with another example, the angle α, i.e., the second angle, may be about 110 degrees to about 170 degrees. When bent, the strap 10 defines two non-coplanar sections 26, 28 of the strap 10 (on either side of the bend 20). In the illustrated strap 10, the sections 26, 28 are each planar, although not necessarily planar relative to each other.

Figure 6:
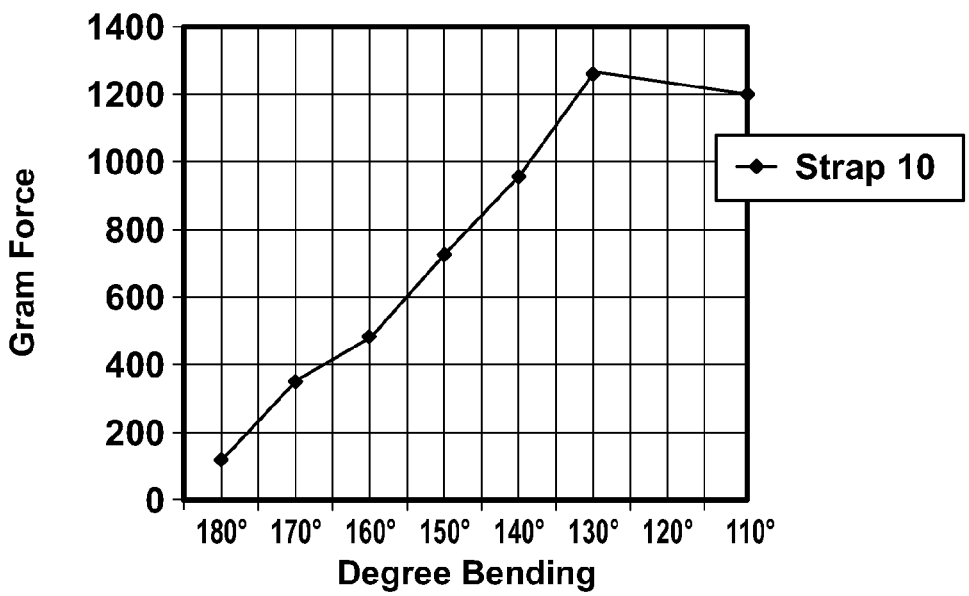
FIG. 6 is a graphical representation of the results of column stiffness testing for a strap formed with a crush region at a 3 inch span test.
Figure 7:
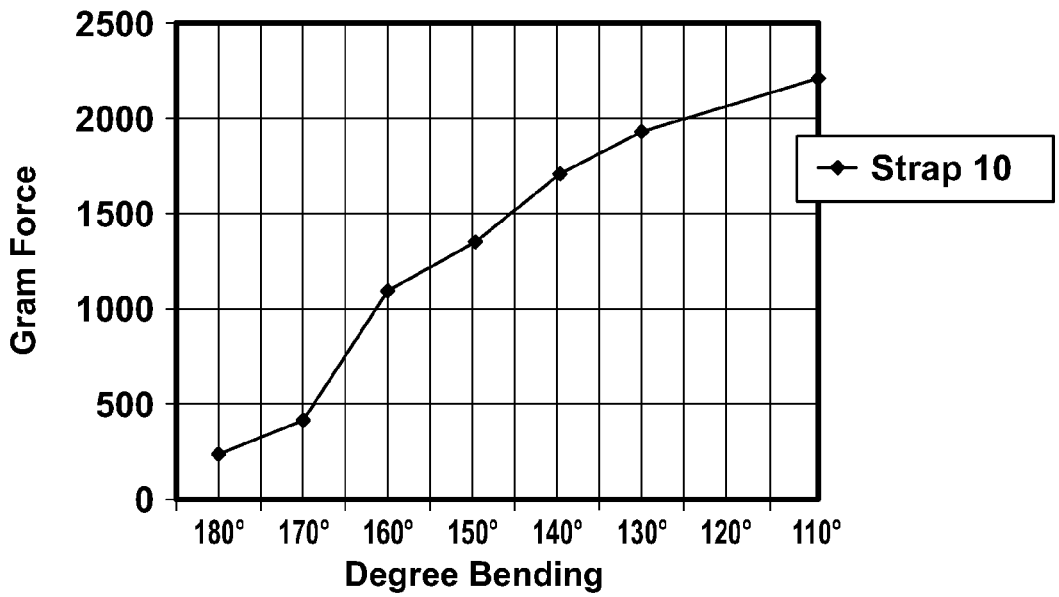
FIG. 7 is a graphical representation of the results of column stiffness testing for a strap formed with a crush region at a 2 inch span test.

It has been found that there is a correspondence between the depth or angle of the bend 20 and increases in column stiffness of the strap 10. More particularly, a test device was constructed to measure a force, in grams, at which a longitudinally oriented length of strap would bend or bow. Samples of strap 10, such as TENAX® brand 1612 strap with a thickness $T_{10}$ of about 12 mils, were folded at various angles α between and including about 180 degrees (flat strap) and about 110 degrees and tested in the device. Tests were conducted with the samples of strap 10 held and the force applied at about 2.0 inches from where the strap 10 was held and at about 3.0 inches from where the strap 10 was held. These parameters were used to demonstrate that increases in column strength were exhibited by longer lengths of strap 10. The results of the tests are shown in Tables 1 and 2 below for the 3.0 inch and 2.0 inch spans, respectively, and are shown graphically in FIGS. 6 and 7, respectively.

TABLE 1

FORCE REQUIRED TO BEND STIFFENED STRAP WITH LONGITUDINAL BEND AT VARIOUS ANGLES, WITH STRAP SECURED AT 3 INCH SPAN

| Sample No. | Angular displacement (in degrees) | Force (in grams) to bending | Percent Increase over flat (180 degree) strap |
|---|---|---|---|
| 1 | 180 | 110 | 0 |
| 2 | 170 | 350 | 218.2 |
| 3 | 160 | 470 | 327.3 |
| 4 | 150 | 720 | 554.5 |
| 5 | 140 | 954 | 767.3 |
| 6 | 130 | 1249 | 1035.5 |
| 7 | 110 | 1194 | 985.5 |

TABLE 2

FORCE REQUIRED TO BEND STIFFENED STRAP WITH LONGITUDINAL BEND AT VARIOUS ANGLES, WITH STRAP SECURED AT 2 INCH SPAN

| Sample No. | Angular displacement (in degrees) | Force (in grams) to bending | Percent Increase over flat (180 degree) strap |
|---|---|---|---|
| 8 | 180 | 276 | 0 |
| 9 | 170 | 462 | 67.4 |
| 10 | 160 | 1094 | 296.4 |
| 11 | 150 | 1340 | 385.5 |
| 12 | 140 | 1713 | 520.7 |
| 13 | 130 | 1918 | 594.9 |
| 14 | 110 | 2200 | 697.1 |

As can be seen from the results of Tables 1 and 2, there is a marked increase in column stiffness by forming just a slight bend, e.g., a 10 degree bend from 180 degrees to 170 degrees, as compared to the flat strap. In strap sections secured at the 3 inch and 2 inch spans, the 170 degree strap showed increases of 218.2 and 67.4 percent, respectively, over the flat strap. At 160 degrees, the increases were 327.3 and 296.4, respectively; at 150 degrees, the increases were 554.5 and 385.5, respectively; at 140 degrees, the increases were 767.3 and 520.7, respectively; at 130 degrees, the increases were 1035.3 and 594.9, respectively; and at 110 degrees, the increases were 985.5 and 697.1, respectively.

The increases at even a slight bend of 10 degrees to 170 degrees were quite significant and showed a drastic, if not unexpected, increase with a slightly greater bend of 20 degrees to 160 degrees. It has also been found that even with these bends of up to about 110 degrees, the strap 10 of the present disclosure is still easily fed through the chutes, driving mechanisms, strapping heads, and other components and assemblies of known strapping machines without undue force and/or adverse consequences.

Further, it will be appreciated by those skilled in the art that typical strap tends to exhibit some coil memory from being wound about a spool. Consequently, known strapping may curl as it is dispensed from a spool and fed through the strap chute of a strapping machine and cause misfeeds. The strap 10 of the present disclosure tends to exhibit less coil memory or curl as it is dispensed from a spool and enters the strapping machine.

Figure 8:
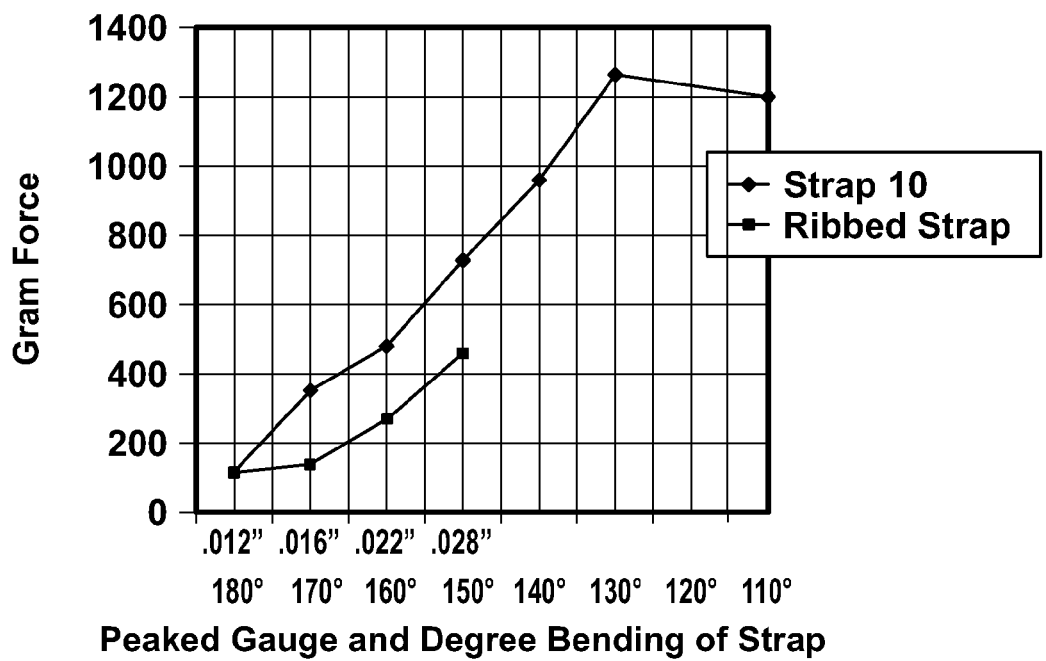
FIG. 8 is a graphical representation of the results of column stiffness testing for a strap with a crush region compared to a strap formed with a ribbed region.

A comparison of the present strap 10 was also made to strap formed with a rib, such as the strap disclosed in the Pearson publication discussed above. The results of the comparison are shown graphically in FIG. 8 relative to the 3.0 inch span test results. The rib was formed to a given peaked height or gauge that represents the height of the rib from the base of the strap. More particularly, the ribbed straps included peaked gauges of about 0.012 inches (a flat strap without any rib), about 0.016 inches, about 0.022 inches, and about 0.028 inches. The strap with the peaked gauge of about 0.028 inches more than doubled the effective thickness of the original strap, which had a thickness of about 0.012 inches. As can be seen in FIG. 8, the strap 10 of the present disclosure can be bent with various angles to provide significantly greater column stiffness than known ribbed straps, which also have a greater flat strap thickness than the flat strap thickness $T_{10}$ of the presently disclosed strap 10.

Although the present disclosure presents strap 10 having a single longitudinal bend 20 (thus generally forming a V-shape), other shapes, such as double bends (forming a W-shape) are contemplated and are within the scope and spirit of the present disclosure.

Numerous modifications to the present disclosure will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

The invention claimed is:

1. A non-perforated strap having increased column stiffness comprising:
   a leading edge and a trailing edge forming a length of the strap;
   a first outer edge and second outer edge defining a width of the strap;
   a first side and a second side defining a thickness of the strap; and
   a crush region formed in the first or second side, between and generally parallel to the first and second outer edges, the crush region defined by a thickness that is less than the thickness of the strap adjacent to the crush region, the crush region forming a continuous line along which a bend is formed in the strap for increasing a column stiffness of the strap, the bend defining a first angle greater than 180 degrees and a second angle less than 180 degrees in the strap as viewed in cross-section,
   wherein the non-perforated strap is configured to be disposed about a load, tensioned and sealed and the crush region is present at the second angle.

2. The strap in accordance with claim 1 wherein the second angle is about 110 degrees to about 180 degrees, exclusive of 180 degrees, and the strap is a plastic strap.

3. The strap in accordance with claim 2 wherein the second angle is about 110 degrees to about 175 degrees.

4. The strap in accordance with claim 3 wherein the second angle is about 120 degrees to about 170 degrees.

5. The strap in accordance with claim 1 wherein the crush region has a thickness that is about 76 percent to about 88 percent of the strap thickness adjacent to the crush region.

6. A non-perforated strap having increased column stiffness comprising:
   a leading edge and a trailing edge forming a length of the strap;
   a first outer edge and second outer edge defining a width of the strap;
   a first side and a second side defining a thickness of the strap; and,
   a crush region formed in the first or second side, between and generally parallel to the first and second outer edges, the crush region defined by a thickness that is less than the thickness of the strap adjacent to the crush region, the crush region forming a continuous line along which a bend is formed in the strap for increasing a column stiffness of the strap, the bend defining a first angle greater than 180 degrees and a second angle about 120 to 170 degrees in the strap as viewed in cross-section, wherein the bend defines first and second non-coplanar, longitudinally extending sections, and wherein the non-perforated strap is configured to be disposed about a load, tensioned and sealed.

7. The strap in accordance with claim 6 wherein the first and second sections defined by the bend are planar.

8. The strap in accordance with claim 6 wherein the crush region has a thickness that is about 76 percent to about 88 percent of the strap thickness adjacent to the crush region.

9. The strap in accordance with claim 6 wherein the crush region is present at the second angle.

10. The strap in accordance with claim 6 wherein the crush region is present at the first angle.

11. A method of forming a strap having increased column stiffness and is configured to be disposed about a load, tensioned and sealed, comprising:
    forming a non-perforated strap having a leading edge and a trailing edge forming a length of the strap, a first outer edge and second outer edge defining a width of the strap, and a first side and a second side defining a thickness of the strap;
    crushing a region in the first or second side, between and generally parallel to the first and second outer edges, the crush region defined by a thickness that is less than the thickness of the strap adjacent to the crush region, the crush region forming a continuous line along which a bend is formed in the strap to increase a column stiffness of the strap, wherein the bend, when formed, defines a first angle greater than 180 degrees and a second angle about 120 degrees to 170 degrees in the strap as viewed in cross-section; and
    bending the strap along the crush region such that the strap forms first and second non-coplanar, longitudinally extending sections, wherein the first and second sections formed by the bend are planar sections, respectively.

\* \* \* \* \*